No. 650,121. Patented May 22, 1900.
W. H. BAXTER.
OPERATING MECHANISM FOR STONE OR ORE CRUSHERS.
(Application filed Aug. 14, 1899.)
(No Model.) 2 Sheets—Sheet 1.
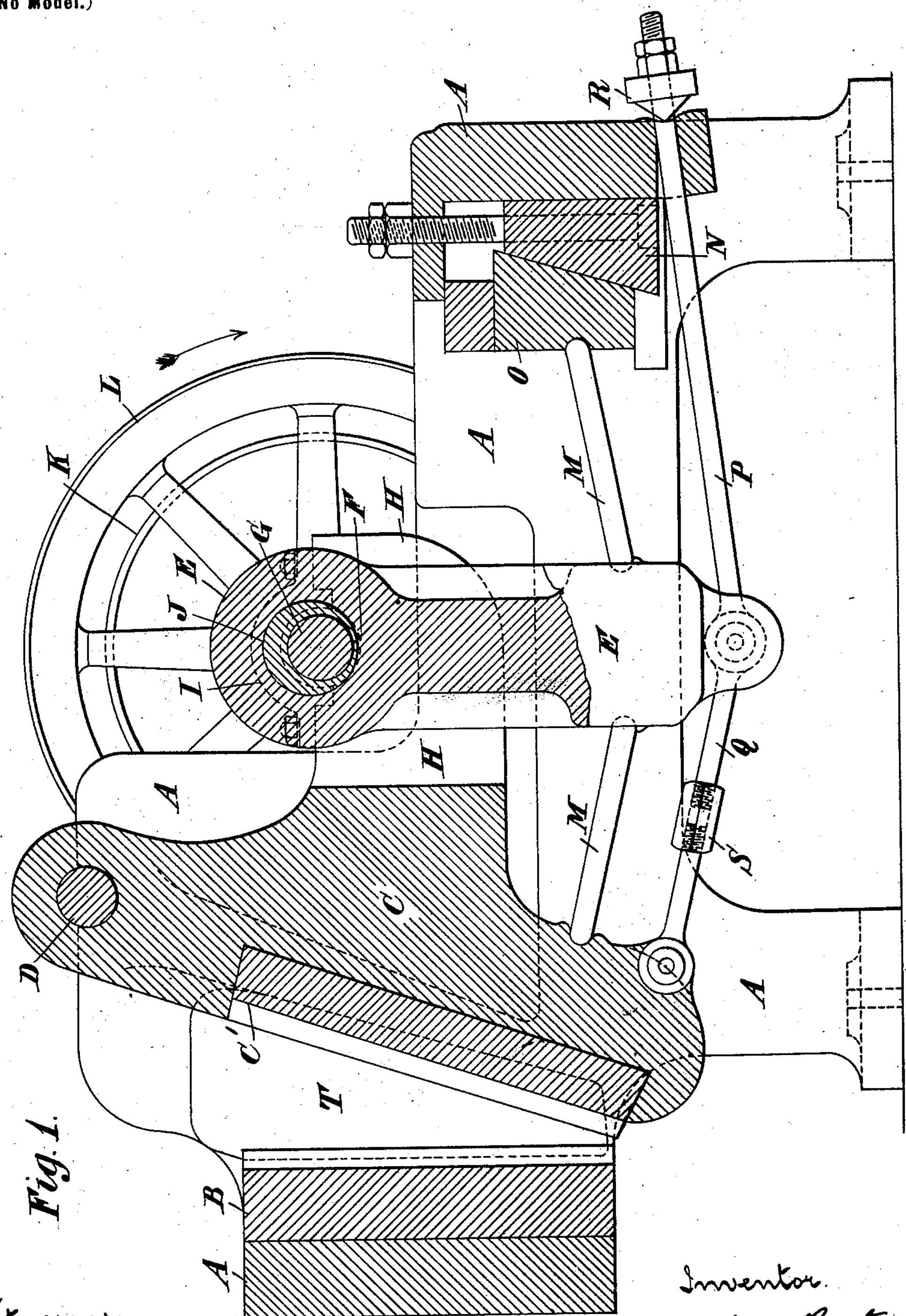
Witnesses:-
William Sadler
Arnold Park
Inventor.
William Henry Baxter
by
H. Fairburn-Hart
Attorney.

No. 650,121. Patented May 22, 1900.
W. H. BAXTER.
OPERATING MECHANISM FOR STONE OR ORE CRUSHERS.
(Application filed Aug. 14, 1899.)
(No Model.) 2 Sheets—Sheet 2.
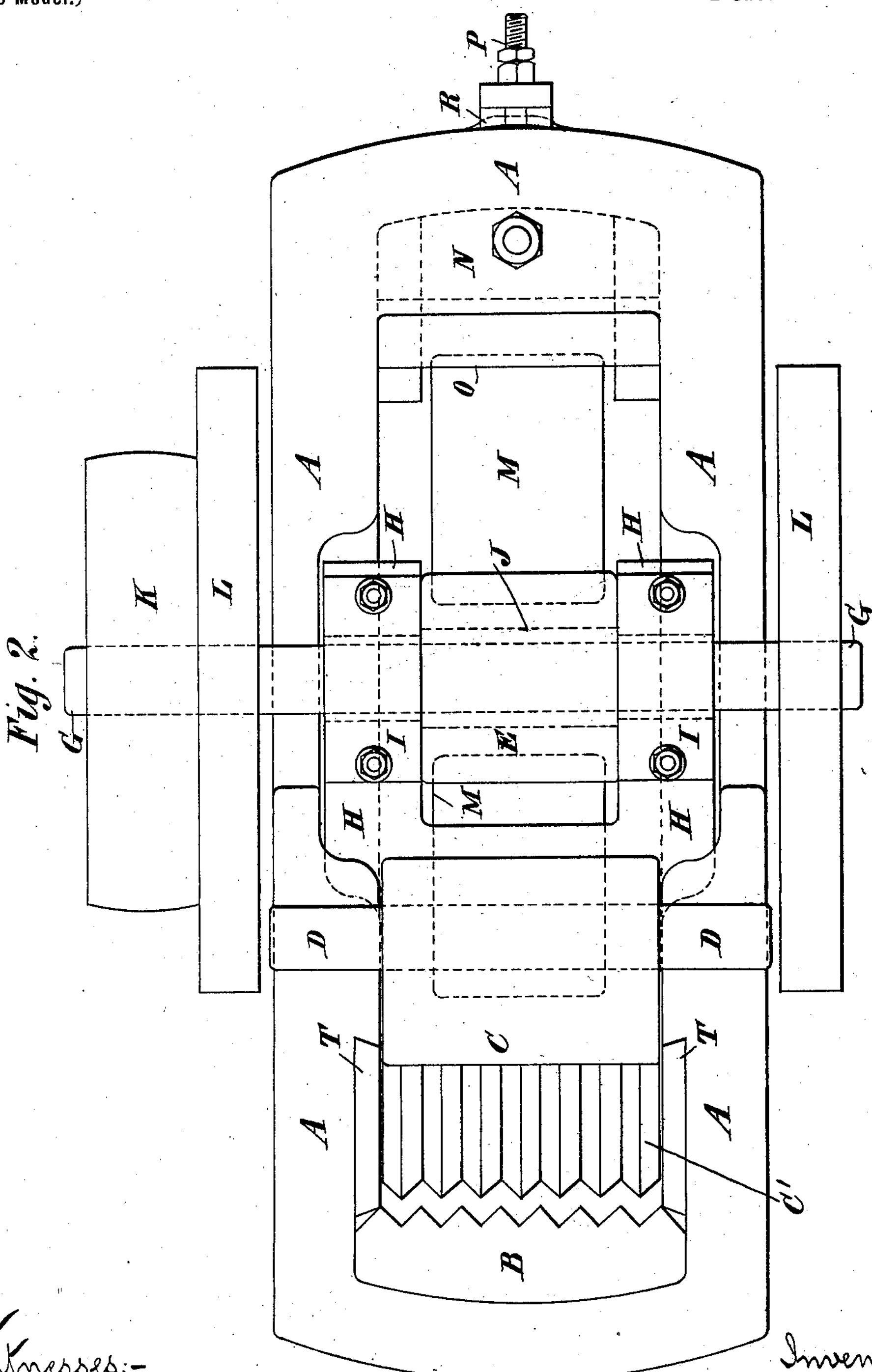
Witnesses:-
William Sadler
Annie Park
Inventor.
William Henry Baxter
by
Wm. Fairburn Hart
Attorney

UNITED STATES PATENT OFFICE.

WILLIAM HENRY BAXTER, OF HARROGATE, ENGLAND.

OPERATING MECHANISM FOR STONE OR ORE CRUSHERS.

SPECIFICATION forming part of Letters Patent No. 650,121, dated May 22, 1900.

Application filed August 14, 1899. Serial No. 727,235. (No model.)

*To all whom it may concern:*

Be it known that I, WILLIAM HENRY BAXTER, a subject of the Queen of Great Britain and Ireland, residing at Harrogate, in the county of York, England, have invented new and useful Improvements in the Operating Mechanism of Stone or Ore Crushers, of which the following is a specification.

This invention relates to improvements in the operating mechanism of stone-breaking and ore-crushing and other machines where similar movements are required—as, for instance, in punching and shearing machines. Its object is to provide means whereby the connecting-rod or pitman of the machine is mounted upon an eccentric on a shaft carried in bearings rigidly connected to or forming part of the rear of the movable jaw, so as to rise and fall therewith, instead of being mounted in bearings which are stationary in the framework, as hitherto. By this means an increased, say, crushing or breaking pressure is imparted to the movable jaw without any serious loss of movement.

In the accompanying drawings the invention is shown as applied to a stone-breaking and ore-crushing machine; but I would distinctly have it understood that it may be applied to other machines where similar movements are required—such as, for instance, punching and shearing machines.

Figure 1 is a sectional elevation, and Fig. 2 a plan, looking at the top of a stone-breaking and ore-crushing machine constructed according to this invention.

A is the main framework of the machine, which may be formed in one piece or built up in parts, bolted or otherwise fixed or secured together by any convenient means, and it may be made of any suitable material—such as, say, cast-iron or steel; B, the fixed jaw, which is arranged in the framework A in the usual position; C, the movable jaw-stock, which is mounted on and to be pendent from a shaft D, carried in bearings formed for its reception in the framework; C', the renewable jaw-face fixed to the jaw-stock C.

The use of caps or covers for the bearings of the shaft D is optional, and I prefer to dispense with their use, as shown in the drawings. The shaft D may either be a fixture in its bearings, in which case the movable jaw-stock C would oscillate thereon, or the said shaft may be a fixture in the jaw-stock C, in which case the projecting ends of the shaft would form trunnions on which the movable jaw-stock C could oscillate in its said bearings. Instead of mounting the connecting-rod or pitman E on a shaft carried in bearings on the framework of the machine, as is usually done, I arrange the bearings F for the shaft G, to be formed in the arms or brackets, hereinafter termed "brackets" H, which may form a part of or be attached to the moving jaw-stock C of the machine. In the drawings the brackets H are shown forming a part of the movable jaw-stock, which is bifurcated to form a pair of brackets H, and they are provided with the caps I, as shown, which are bolted or otherwise fixed to the said brackets for retaining the shaft G in position.

On the shaft G is or are mounted or fixed one or more eccentrics J, on which the connecting-rod or pitman E is pendently mounted. The eccentric or eccentrics J is or are arranged to rotate in the eye or hole in the upper part of the pitman E, as shown. On the said shaft G are also mounted and fixed the usual driving-pulley K and fly wheel or wheels L. The lower end of the connecting-rod or pitman E is retained in position by a pair of toggles M, respectively interposed on each side thereof in the usual manner between the movable jaw-stock C and the movable wedge N for adjusting the toggle-block O of the machine. The parts are supported in the machine and operated in the usual manner. Above or below the position of the said toggles N is arranged and mounted a second set or sets of toggle-levers, hereinafter termed the "drawback-rods" P Q, in the form of suspension levers or rods and with or without a spring buffer or buffers R of the usual and ordinary construction. The drawback-rods P Q are arranged, respectively, on each side of the pitman or connecting-rod E. Their inner ends are attached together, while their outer ends are connected to the framework A and movable jaw-stock C—that is to say, the outer end of drawback-rod P, is adjustably secured to the spring-buffer R at the rear end of framework A, or the ends of these last-named levers, rods, or chains are connected to a very strong eye bolt or bolts, or it or their equivalents, secured to the rear end of the machine, while the outer end of drawback-rod Q, which is made in two parts, so as to be capable of adjustment by means of nut S, having a right and left hand thread cut therein or otherwise, is attached to the movable jaw-stock C. If desired, a chain or chains may be used in place of one or both of the drawback-rods P Q. These last-named toggle-levers, rods, or chains not only aid in suspending the connecting-rod or pitman, but also in retaining it in position during the movement of the eccentric or eccentrics.

In place of the toggle-levers, rods, or chains the whole of the working parts may be held in position by a rod and strong spring attached, respectively, to the movable jaw-stock and to the outer or other portion of the framework.

Side wedges T may or may not be inserted in the framework A to prevent it wearing away and which may be readily replaced and provide a ready means for renewing this portion of the framework A, as occasion requires.

By mounting the shaft G in the bearings F of bracket H, forming part of or attached to the movable jaw-stock C, instead of in bearings in framework A, as is usually done, the whole weight of the fly-wheels L, pulley K, and connecting-rod or pitman E, which are mounted or fixed on said shaft, are utilized for increasing the crushing or breaking pressure that is imparted to the lower end of the said movable jaw-stock whenever the eccentric or eccentrics J is or are caused to rotate and move the upper part of the connecting-rod or pitman E rearwardly simultaneously with the angular and downward movement of the said pitman. This movement is permissible, owing to the pitman E being suspended at its lower end by the drawback-rods P Q and the interposition of the toggles M, as previously described. As soon as the eccentric or eccentrics J is or are rotated and passed it or their nadir or lowest point or points the connecting-rod or pitman E will, by the continued rotation of the eccentric or eccentrics, commence to return to the position shown in the drawings, and in so doing the movable jaw C will, by the drawback-rods P Q and toggles M, be withdrawn from the fixed jaw B.

Other parts of the machine not particularly described or shown may be of the usual and ordinary construction.

It will be readily understood that instead of placing the eccentric-shaft directly on the brackets H of the jaw-stock C one or more levers may be arranged so as to rest on this position and to be operated by a connecting-rod and crank or eccentric shaft supported in bearings mounted in or on the framework, so that the actual weight or pressure of the operating parts is imparted directly to the jaw-stock C for breaking or crushing the material operated upon.

Having now described the nature of my said invention, what I claim, and desire to secure by Letters Patent, is—

1. In a stone-breaking and ore-crushing machine, the combination of a movable jaw-stock, a shaft on which the movable jaw-stock is mounted, brackets rigidly connected to the rear of and moving with said jaw-stock, a shaft carried in bearings and rising and falling within said brackets, an eccentric mounted upon the last-named shaft, a pitman mounted on said eccentric, suitable connections between said pitman and the jaw-stock all substantially as and for the purposes set forth.

2. In a stone-breaking and ore-crushing machine, the combination of a movable jaw-stock, a shaft on which the movable jaw-stock is mounted, brackets at the rear of and moving with said jaw-stock, a shaft carried in said brackets an eccentric mounted upon the last-named shaft, a pitman mounted on said eccentric, adjustable drawback-rods attached together at one end at the lower end of pitman and at their other ends respectively to the movable jaw-stock and framework of the machine, a toggle-block at the rear of the machine, a wedge at the back of toggle-block, toggles respectively interposed between movable jaw-stock, pitman, and toggle-block, and the fly-wheels and driving-pulley mounted upon the eccentric-shaft, all substantially as and for the purposes set forth.

In witness whereof I have hereunto set my hand in presence of two witnesses.

WILLIAM HENRY BAXTER.

Witnesses:
ADAM C. HART,
ANNIE PARK.